(12) United States Patent
Jenkins

(10) Patent No.: US 11,543,941 B2
(45) Date of Patent: Jan. 3, 2023

(54) INTELLIGENT CONTENT QUEUING FROM A SECONDARY DEVICE

(71) Applicant: Nagravision S.A., Cheseaux-sur-Lausanne (CH)

(72) Inventor: David Rhys Edward Jenkins, Cardiff (GB)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 17/302,565

(22) Filed: May 6, 2021

(65) Prior Publication Data
US 2021/0365162 A1 Nov. 25, 2021

Related U.S. Application Data

(63) Continuation of application No. 16/216,477, filed on Dec. 11, 2018, now Pat. No. 11,036,359, which is a
(Continued)

(51) Int. Cl.
*H04N 21/482* (2011.01)
*G06F 3/0482* (2013.01)
(Continued)

(52) U.S. Cl.
CPC .......... *G06F 3/0482* (2013.01); *G06F 3/0488* (2013.01); *H04N 21/41265* (2020.08);
(Continued)

(58) Field of Classification Search
CPC ................ G06F 3/0482; G06F 3/0488; H04N 21/41265; H04N 21/42224;
(Continued)

(56) References Cited

U.S. PATENT DOCUMENTS 6,526,411 B1 2/2003 Ward
8,776,139 B2 7/2014 De Vaan
(Continued)

FOREIGN PATENT DOCUMENTS

AU 2015308431 8/2018
CN 106797494 5/2021
(Continued)

OTHER PUBLICATIONS

"International Application Serial No. PCT EP2015 069584, International Search Report dated Dec. 1, 2015", 5 pgs.
(Continued)

*Primary Examiner* — Hien L Duong
(74) *Attorney, Agent, or Firm* — Schwegman Lundberg & Woessner, P.A.

(57) ABSTRACT

Example embodiments provide systems and methods for managing intelligent content queuing from a secondary device for content delivery to a primary device. A content queuing system on the secondary device generates and displays a playlist interface on the secondary device. A selection of a content item to be added to a playlist is received. The content queuing system determines that addition of the content item causes a live content item to overlap with an on-demand content item on the playlist. As a result, the content queuing system creates at least two segments for the on-demand content item. The live content item is positioned between the first and a second segment on the playlist. The first segment is scheduled to end at a start time of the live content item and the second segment is scheduled to begin at an ending time of the live content item.

18 Claims, 11 Drawing Sheets

Related U.S. Application Data continuation of application No. 14/834,285, filed on Aug. 24, 2015, now Pat. No. 10,185,467.

(60) Provisional application No. 62/043,324, filed on Aug. 28, 2014.

(51) Int. Cl.
| | |
|---|---|
| *H04N 21/422* | (2011.01) |
| *H04N 21/436* | (2011.01) |
| *H04N 21/44* | (2011.01) |
| *H04N 21/472* | (2011.01) |
| *H04N 21/442* | (2011.01) |
| *H04N 21/41* | (2011.01) |
| *G06F 3/0488* | (2022.01) |

(52) U.S. Cl.
CPC . *H04N 21/42224* (2013.01); *H04N 21/43615* (2013.01); *H04N 21/44016* (2013.01); *H04N 21/44224* (2020.08); *H04N 21/44226* (2020.08); *H04N 21/472* (2013.01); *H04N 21/4825* (2013.01)

(58) Field of Classification Search
CPC ....... H04N 21/43615; H04N 21/44016; H04N 21/44224; H04N 21/44226; H04N 21/472; H04N 21/4825
See application file for complete search history.

(56) References Cited

U.S. PATENT DOCUMENTS

| | | | |
|---|---|---|---|
| 9,338,521 | B2 | 5/2016 | Cheng et al. |
| 9,674,476 | B2 | 6/2017 | Coburn et al. |
| 9,860,580 | B1 | 1/2018 | Garg et al. |
| 11,036,359 | B2 | 6/2021 | Jenkins |
| 2002/0049974 | A1 | 4/2002 | Shnier |
| 2002/0184457 | A1* | 12/2002 | Yuasa ................. H04N 21/4335 |
| 2003/0182315 | A1 | 9/2003 | Plastina et al. |
| 2006/0059535 | A1 | 3/2006 | D'avello |
| 2008/0033990 | A1 | 2/2008 | Hutson et al. |
| 2008/0059884 | A1 | 3/2008 | Ellis et al. |
| 2011/0107374 | A1* | 5/2011 | Roberts ............... H04N 21/6582 725/50 |
| 2012/0042091 | A1* | 2/2012 | McCarthy ............ H04N 21/812 709/231 |
| 2012/0057853 | A1 | 3/2012 | Huber et al. |
| 2012/0210230 | A1* | 8/2012 | Matsuda ............. G06F 3/04842 715/723 |
| 2012/0265893 | A1 | 10/2012 | Woxblom et al. |
| 2013/0014181 | A1* | 1/2013 | De Vaan .............. H04N 21/458 725/58 |
| 2013/0078990 | A1 | 3/2013 | Kim et al. |
| 2013/0159421 | A1 | 6/2013 | Yue et al. |
| 2014/0006364 | A1 | 1/2014 | Eguchi et al. |
| 2014/0082645 | A1* | 3/2014 | Stern ................ H04N 21/26258 725/23 |
| 2014/0282772 | A1 | 9/2014 | Chen et al. |
| 2015/0113407 | A1 | 4/2015 | Hoffert et al. |
| 2016/0062569 | A1 | 3/2016 | Jenkins |

FOREIGN PATENT DOCUMENTS

| | | |
|---|---|---|
| EP | 3186972 | 7/2017 |
| EP | 3186972 | 3/2022 |
| JP | 2017529772 | 10/2017 |
| KR | 20070048783 | 5/2007 |
| KR | 20130032192 | 4/2013 |
| KR | 102400222 | 5/2022 |
| WO | WO 2016/030437 | 3/2016 |

OTHER PUBLICATIONS

"International Application Serial No. PCT EP2015 069584, Written Opinion dated Dec. 1, 2015", 8 pgs.

"U.S. Appl. No. 14/834,285, Non Final Office Action dated Mar. 13, 2018", 21 pgs.

"Australian Application Serial No. 2015308431, First Examination Report dated Nov. 16, 2017", 4 pgs.

"U.S. Appl. No. 14/834,285, Response filed Jun. 12, 2018 to Non Final Office Action dated Mar. 13, 2018", 13 pgs.

"Australian Application Serial No. 2015308431, Response filed Jun. 13, 2018 to First Examination Report dated Nov. 16, 2017", 85 pgs.

"U.S. Appl. No. 14/834,285, Notice of Allowance dated Sep. 10, 2018", 6 pgs.

"U.S. Appl. No. 16/216,477, 312 Amendment filed Apr. 15, 2021", 7 pgs.

"U.S. Appl. No. 16/216,477, Supplemental Notice of Allowability dated Apr. 28, 2021", 2 pgs.

"U.S. Appl. No. 16/216,477, PTO Response to Rule 312 Communication dated Apr. 22, 2021", 1 page.

"Korean Application Serial No. 10-2017-7008473, Notice of Preliminary Rejection dated Aug. 24, 2021", with English translation, 15 pages.

"Canadian Application Serial No. 2,958,843, Office Action dated Aug. 25, 2021", 4 pages.

"European Application Serial No. 15763223.3, Response filed Jul. 23, 2021 to Summons to Attend Oral Proceedings dated Jan. 13, 2021", w English Claims, 10 pages.

"Korean Application Serial No. 10-2017-7008473, Response filed Oct. 25, 2021 to Notice of Preliminary Rejection dated Aug. 24, 2021", with English claims, 24 pages.

"Canadian Application Serial No. 2,958,843, Response Filed Dec. 23, 21 to Office Action dated Aug. 25, 2021", 8 pages.

\* cited by examiner

INTELLIGENT CONTENT QUEUING FROM A SECONDARY DEVICE

CROSS REFERENCE TO RELATED APPLICATIONS

The present application is a continuation of U.S. patent application Ser. No. 16/216,477, filed on Dec. 11, 2018, which is a continuation of U.S. patent application Ser. No. 14/834,285, filed on Aug. 24, 2015 and entitled "INTELLIGENT CONTENT QUEUING FROM A SECONDARY DEVICE," which claims the priority benefit of U.S. Provisional Patent Application Ser. No. 62/043,324 filed on Aug. 28, 2014 and entitled "SYSTEM AND METHOD OR INTELLIGENT CONTENT QUEUING FROM A SECOND SCREEN," which applications are incorporated herein by reference in their entireties.

FIELD

The present disclosure relates generally to content delivery and presentation and, in a specific example embodiment, to mechanisms and processes for managing intelligent content queuing from a secondary device for content delivery to a primary device.

BACKGROUND

There is a universe of content available through a television operator's platform including live television and on-demand content (e.g., content stored on a personal video recorder (PVR), content sourced from third parties, Internet streamed videos (e.g., YouTube), and so on) As a result it has become increasingly overwhelming and time consuming to search and discover suitable content. The process of sequential and cyclical content selection and consumption is cumbersome. This select-watch-select-watch, ad infinitum, process takes away from a user's "consumption-momentum" and makes it burdensome for users to quickly navigate, select, and consume multiple content items in an easy manner.

Further still, a user may want to watch a combination of on-demand and live content. However, construction of a playlist to accommodate a mix of on-demand and live content is a complex task. A television remote or television interface does not provide a convenient and user-friendly interface for complex content selection and ordering.

BRIEF DESCRIPTION OF DRAWINGS

Various ones of the appended drawings merely illustrate example embodiments of the present invention and cannot be considered as limiting its scope.

DETAILED DESCRIPTION

Figure 1:
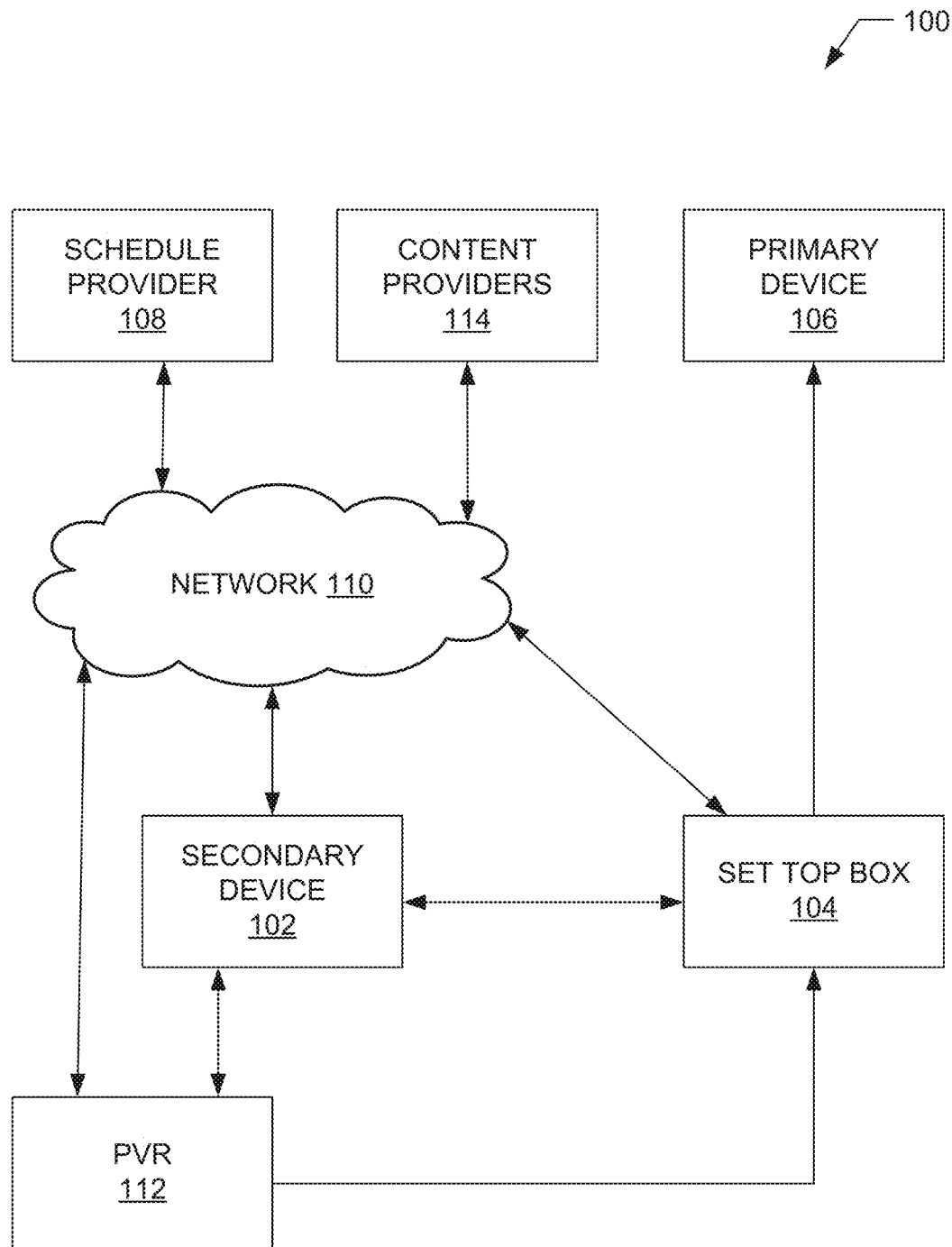
FIG. 1 is a diagram illustrating an example environment for providing intelligent content queuing from a secondary device.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail.

Example embodiments described herein provide systems and methods for managing intelligent content queuing from a secondary device for content delivery to a primary device. In particular, example embodiments provide mechanisms and logic (also referred to as a "content queuing system") on the secondary device to navigate and create content queues (also referred to as "watch lists" or "playlists"), which effect sequential playout (or playback) of content on any given primary device (e.g., television, display) that is coupled to the secondary device. In example embodiments, the content queuing system provides user interfaces that allow easy navigation of recommended content and automated, dynamic scheduling of on-demand content items around live content items. A user of the secondary device can create the playlist of content from various sources including, but not limited to, live television, a personal video recorder (PVR), on-demand content, and streaming content. The content may be played using devices such as Chromecast, set-top boxes (STB), or display devices configured to play out the queued content on a screen. The content can also be played through the secondary device itself.

When modifying the playlist, if an on-demand content item overlaps with a live content item, the content queuing system schedules the on-demand content item around the live content item. In one embodiment, the on-demand content item is split into at least two segments. A first segment is scheduled prior to the live content item, while a second segment is scheduled immediately after the live content item. If playback control inputs (e.g., pause, stop, rewind, fast forward) affect playing of any on-demand content prior to a scheduled live content item, the content queuing system automatically adjusts the segments around the live content item (e.g., changing a duration of each segment to fit the schedule of the live content item).

As a result, one or more of the methodologies described herein facilitate solving the technical problem of managing intelligent content queuing from the secondary device for display of a combination of live and on-demand content on any coupled primary device (e.g., television or display). The methodologies provide user interfaces and logic that allow a user to quickly navigate, select, and consume multiple content items. The logic also dynamically schedules the on-demand content items around live content items in an automated manner for automatic, continuous playback of content items. As a result, one or more of the methodologies described herein may obviate a need for certain efforts or resources that otherwise would be involved in searching for content, manually reorganizing on-demand content in order to accommodate live content, and manually switching between on-demand and live content. Additionally, resources used by one or more machines, databases, or devices (e.g., within the environment) may be reduced. Examples of such computing resources include processor cycles, network traffic, memory usage, data storage capacity, power consumption, network bandwidth, and cooling capacity.

With reference to FIG. 1, a diagram illustrating an example environment 100 in which embodiments of a system for intelligent content queuing from a secondary device 102 is shown. In one embodiment, the secondary device 102 is configured with a content queuing system (discussed further in connection with FIG. 2) that allows a user of the secondary device 102 to create and manage a playlist that dynamically organizes live and on-demand content. The secondary device 102 also controls the playing of the content on the playlist, via a set-top box (STB) 104, on a primary device 106 (e.g., television or display). The secondary device 102 may be a tablet, smartphone, personal computer, or other mobile or computing devices that includes the content queuing system that allows for the generation and manipulation of the playlist. Additionally, the secondary device 102 maintains or detects a current local time and current play status of the STB 104 (or primary device 106).

The content queueing system of the secondary device 102 is activated in order to create the playlist and control the content displayed on a screen of the primary device 106. In one embodiment, the user taps the secondary device 102 to the STB 104 to connect to the primary device 106. The user is then able to control the content displayed on the primary device 106 from the secondary device 102. In alternative embodiments, near field communication (NFC), Bluetooth, or other forms of communication that allow exchange of data over short distances may be used to allow exchange of data between the secondary device 102 and the STB 104. Further still, in another alternative embodiment, the STB 104 may not be necessary if the functionalities associated with the STB 104 are built into the primary device 106.

Once coupled to the primary device 106, the user selects their profile on the secondary device 102. The selection launches the screen of the secondary device 102 to display an existing playlist for the selected profile. Alternatively, if no playlist exists, a blank playlist is displayed whereby the user may select content to populate the blank playlist. While displaying either the existing playlist or the blank playlist, the secondary device 102 displays recommended content from which the user may select to add to the playlist. The user may also remove content items already on their playlist or move content items around in a schedule of the playlist. In one embodiment, the primary device 106 also shows the playlist on its screen if no content is currently being viewed on the screen of the primary device 106.

The playlist is constructed from on-demand content and live content. In example embodiments, the secondary device 102 obtains a schedule of live content from a schedule provider 108 via a network 110. The network 110 may comprise the Internet, a wireless network, a cellular network, or a wide area network (WAN). The secondary device 102 also can access a coupled PVR 112 to determine what stored content is on the PVR 112. For simplicity of discussion, content stored on the PVR 112 is also referred to herein as "on-demand content" since the content can be played at any time after storage on the PVR 112.

When adding content to the playlist or moving content around on the playlist, the content queuing system automatically segments on-demand content around live content if the on-demand content overlaps with the live content. Since it is desirable to view the live content as it is be broadcasted or streamed, the live content is considered to be immovable and is given priority over on-demand content items. Therefore, the on-demand content item that overlaps may be shown in segments before and after the live content item. The segmentation process will be discussed in more detail below.

One type of recommended content provided by the content queuing system is a mood selection recommendation that allows the user to receive content recommendations based on a type of mood in which the user wants to be while watching the content. For instance, the user may select the mood "Make Me Happy." In this example, on-demand or live content that are tagged (e.g., with a metatag) as being in a "happy" category are suggested to the user. In various embodiments, the suggested content is unique to each user and may differ from one user to the next even if the same mood is selected. This may be the case as specific user attributes (e.g., past viewing history, past selected content in the category as stored in their profile) are factored into the recommendation. Another example mood type may be "Thrill Me." Any mood type may be used so long as corresponding tags exist in the content.

In some embodiments, a negative recommendation may be factored into a set of recommended content presented to the user. A negative recommendation is based on a user removing content from the playlist, which triggers the content queuing system to provide less weight to related or similar content in the future.

In another embodiment, the negative recommendation may be correlated with social network connections. For example, if the content was recommended by a social network connection and the user removes the content from the playlist one or more times (or never accepts the recommendations from the social network connection), any further recommendations from the same social network connection will be given lesser weight and the social network connection may also be given a lesser weight.

In some embodiments, automatic recommended content items are added to the playlist of the user based on the user's profile information. By using automatic recommendations, content is continuously queued for viewing without any user intervention. The automatic recommendations added to the playlist may be based on factors such as, for example, the user's watching history, mood selection, social network, or negative recommendations. For instance, if the user has watched the first ten episodes of a series, the content queuing system may automatically add episode 11 to the playlist. Of course, the user can modify (e.g., add, delete, or rearrange) the automatic recommendations added to the playlist.

The environment also comprises a plurality of networked content providers 114 that provide both the live content and the on-demand content to be displayed on the primary device 106. The content providers 114 may be live content providers such as broadcast cable providers and satellite providers. The content providers 114 may also be on-demand content providers such as Internet video source providers and cable network video-on-demand (VOD) providers.

It is noted that the environment 100 shown in FIG. 1 is merely an example and not all components of the environment 100 may be shown. For example, an in-home network (not shown) may connect the primary device 106 and the secondary device 102, and allow access to the content providers 114. In another example, the secondary device 102 may be the primary device 106. For example, the secondary device 102 may be a tablet that can also display the content items.

Figure 2:
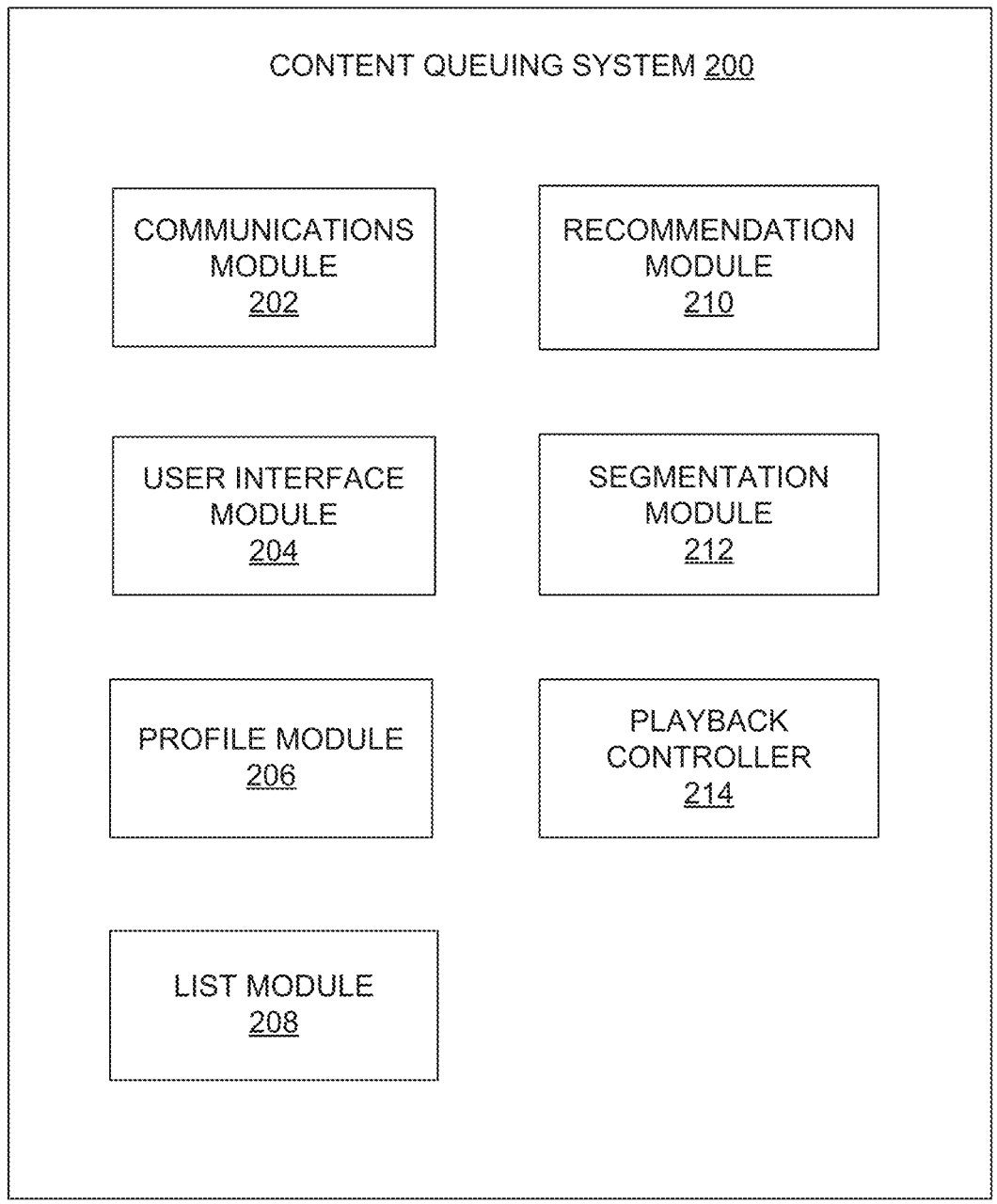
FIG. 2 is a block diagram illustrating an example embodiment of a content queuing system.

FIG. 2 is a block diagram illustrating an example embodiment of a content queuing system 200 embodied within the secondary device 102. The content queuing system 200 is configured to allow a user of the secondary device 102 to create and manage a playlist that dynamically organizes live and on-demand content, and to control playing of the content on the playlist. To enable these operations of the content queuing system 200, the content queuing system 200 comprises a communications module 202, a user interface module 204, a profile module 206, a list module 208, a recommendation module 210, a segmentation module 212, and a playback controller 214. The content queuing system 200 may comprise other components not pertinent to example embodiments that are not shown or discussed. Furthermore, alternative embodiments may comprise more, less, multiples of, or other components. Additionally, some functions of the components may be combined or divided into two or more further components.

The communications module 202 manages data exchange between the content queuing system 200 and the other components of the environment 100 including the STB 104. For example, when the secondary device 102 taps (or otherwise communicatively couples to) the STB 104, the communications module 202 causes a signal to be exchanged that triggers the STB 104 to synchronize with the secondary device 102 and to turn on the primary device 106. The tap also triggers activation of the content queuing system 200 on the secondary device 102. In an alternative embodiment, the user may manually activate the content queuing system 200. In one embodiment, the content queuing system 200 discovers the STB 104 through Universal Plug and Play (UPnP) standards-based UDP device discovery.

The user interface module 204 generates and causes display of various user interfaces on the secondary device 102, which may, in some cases, be simultaneously displayed on the screen of the primary device 106. The user interfaces include a profile interface that displays a list of profiles maintained by the content queuing system 200 (e.g., in a storage unit of the secondary device 102). The user interfaces also include a playlist interface that shows the user's playlist and allows the user to add, delete, and modify content on the playlist. Various user interfaces will be discussed in more detail in connection with FIG. 3A-3D below.

The profile module 206 manages profiles maintained by the content queuing system 200. Because more than one user may use the secondary device 102 to create playlists and play content from their playlist, a separate profile is created for each user. The profile may include or be linked to, for example, preferences of the user, a watch history of the user, an image of the user, and social network connections of the user. The profile module 206 stores profile information (e.g., in a storage unit of the secondary device 102) and retrieves the profile information when needed. The profile information is then provided to the user interface module 204 which generates and displays the profile interface.

The list module 208 manages the playlists that are stored at the secondary device 102 and allows for modification of the playlist. As such, the list module 208 stores list data of the playlist to memory of the secondary device 102 and also retrieves the list data from memory. For example, when a profile is selected, the list module 208 accesses the memory of the secondary device 102 to retrieve list data for an existing playlist for the user associated with the selected profile. The retrieved list data is then used by the user interface module 204 to generate and display a playlist interface.

The list module 208 also reorganizes content items on the playlist such that on-demand content items are scheduled around live content items in the most efficient manner. For example, if a user adds an on-demand content item that is 2 hours in duration in front of a second on-demand content item that is 1 hour in duration and a live content item will be starting in 2 hours, the list module 208 may push the second on-demand content item to after the live content item in order to schedule the 2-hour on-demand content item prior to the live content item. Further still, the list module 208 may position a promo between content items (e.g., before or after a live content item).

The recommendation module 210 manages recommendations presented to the user on the playlist interface. In example embodiments, the recommendation module 210 presents selectable categories including mood type categories (e.g., Make Me Happy, Thrill Me), a live content category, and on-demand categories (e.g., action, comedy, romance, teach me). Based on a selection of one of the categories, recommended content items within the selected category are presented to the user. Accordingly, the user creates a playlist by scrolling through categories in a category section of the playlist interface. When the user stops on a category, as detected by the recommendation module 210, a recommended content item is displayed in an item section of the playlist interface. In example embodiments, swiping or dragging left in the item section 316 brings up recommended content items that are live content items, while swiping or dragging right in the item section 316 brings up recommended content items that are on-demand content items (or vice-versa in an alternative embodiment).

The user can select a content item by tapping or clicking on the content item. The list module 208 detects the tap or click and automatically places a selected on-demand content item at the bottom of the playlist and a selected live content item at a time corresponding to the live content item. Alternatively, the user can drag and drop the selected content item onto a particular position on the playlist (as detected by the list module 208). If the drag and drop causes an on-demand content item to not fit within a time frame prior to a live content item on the playlist (e.g., overlaps with the live content item), the segmentation module 212 segments the on-demand content to fit around the live content item. As such, the on-demand content will be scheduled such that a first segment will stop playing at a start time of the live content item, with a second segment comprising the remainder of the on-demand content automatically playing immediately after an end time of the live content item.

Accordingly, the segmentation module 212 works with the list module 208 to automatically reorganize, segment, or both reorganize and segment on-demand content items around live content items in real-time. Any change in the schedule of the live content item or an event applied to an on-demand content prior to the live content item (e.g., pausing, stopping, rewinding, forwarding) triggers a reorganization of the playlist and possibly a change to the segments to accommodate the change in timing.

The playback controller 214 manages the playing of the content items on the playlist. In example embodiments, playback controls (e.g., play, stop, pause, rewind, fast forward) are displayed on the user interface (e.g., playlist interface). When the user selects one of the playback controls (e.g., provides a playback control input), the playback controller 214 triggers the performance of the corresponding playback operation. For example, the playback controller 214 issues commands (e.g., instructions) to the STB 104 to invoke and control the playback of the current content item on the playlist. In response, the STB 104 will access the content item and start, stop, pause, fast forward, or rewind playback of the content item. In one embodiment, the playback controller 214 uses Digital Living Network Alliance (DLNA)/UPnP commands to initiate, pause, stop, forward, and rewind playback of the content items.

Additionally, the playback controller 214 controls the automatic switching of content items being displayed. For example, the playback controller 214 may automatically send instructions to the STB 104 to access and retrieve an on-demand content item from the proper content provider 114 for display on the primary device 106 when the on-demand content item is queued to be presented, according to the playlist. When the playback controller 214 switches from an on-demand content item that is segmented to a live content item, the playback controller 214 uses a UPnP AV media position to fetch a current on-demand (content item) position or interruption point (e.g., minutes and seconds consumed of the on-demand content item) and temporarily stores the on-demand position or interruption point, according to one embodiment. As such, the playback controller 214 automatically causes the pausing of the on-demand content item at the end of the first segment, which corresponds to a start time of the live content item. The playback controller 214 then automatically invokes playing of the live content item at its scheduled start time. Upon completion of the live content item, the playback controller 214 uses the previously stored on-demand content position or interruption point as the starting point for the second segment of the on-demand content item in order to automatically resume playing the segmented on-demand content item.

Accordingly, the playback controller 214 works with the segmentation module 212 and the list module 208 to dynamically update the playlist, such as adjusting segments around a live content item by dynamically adjusting an interruption point (e.g., stopping point of the first segment) of the on-demand content item. The adjustment may be caused, for example, by user behavior (e.g., stopping or pausing playback of the first segment).

Further still, the user may stop playback of an on-demand content item on the primary device 106. The playback controller 214 notes the interruption point where the on-demand content item stopped and temporarily stores the interruption point. The user may then couple to a second primary device 106 (e.g., a different television) and resume playing the on-demand content item from the interruption point.

Figure 3A:
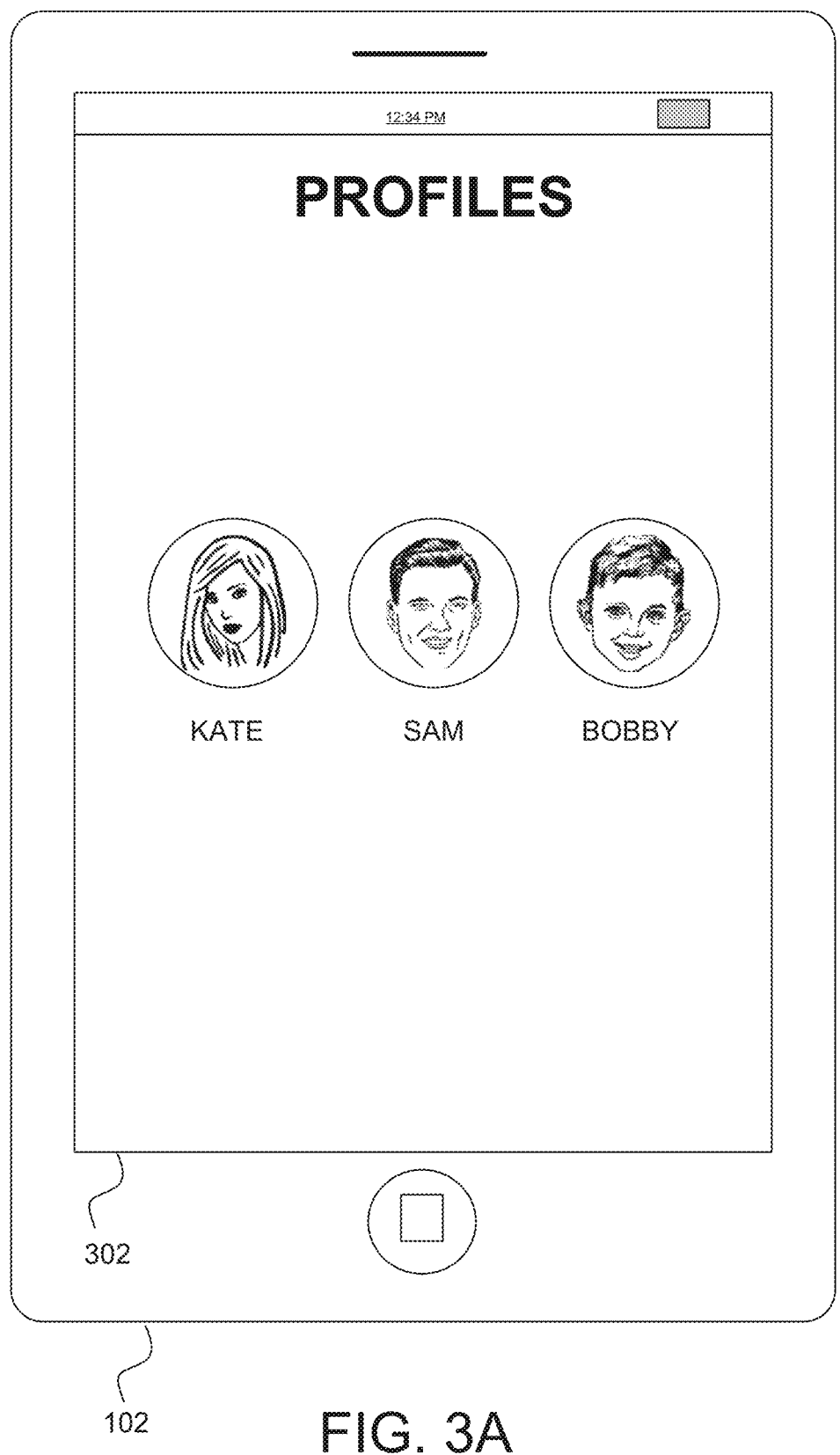
FIG. 3A-3D illustrate user interfaces presented on the secondary device for providing intelligent content queuing, according to example embodiments.

FIGS. 3A-3D are example user interfaces presented on the secondary device 102 that enable the user to create and modify a playlist and to cause playing of the content items on the primary device 106. FIG. 3A illustrates a user profile interface 302. When the user activates the content queuing system 200 (e.g., by tapping the secondary device 102 to the STB 104), the profile interface 302 is presented on the secondary device 102. In some embodiments, the profile interface 302 may also be shown on the primary device 106 via the STB 104. The profile interface 302 shows all users associated with the secondary device 102 that have set up a profile with the content queuing system 200. The user selects their profile in order to access their playlist. In the present example, the user selects "Kate."

Figure 3B:
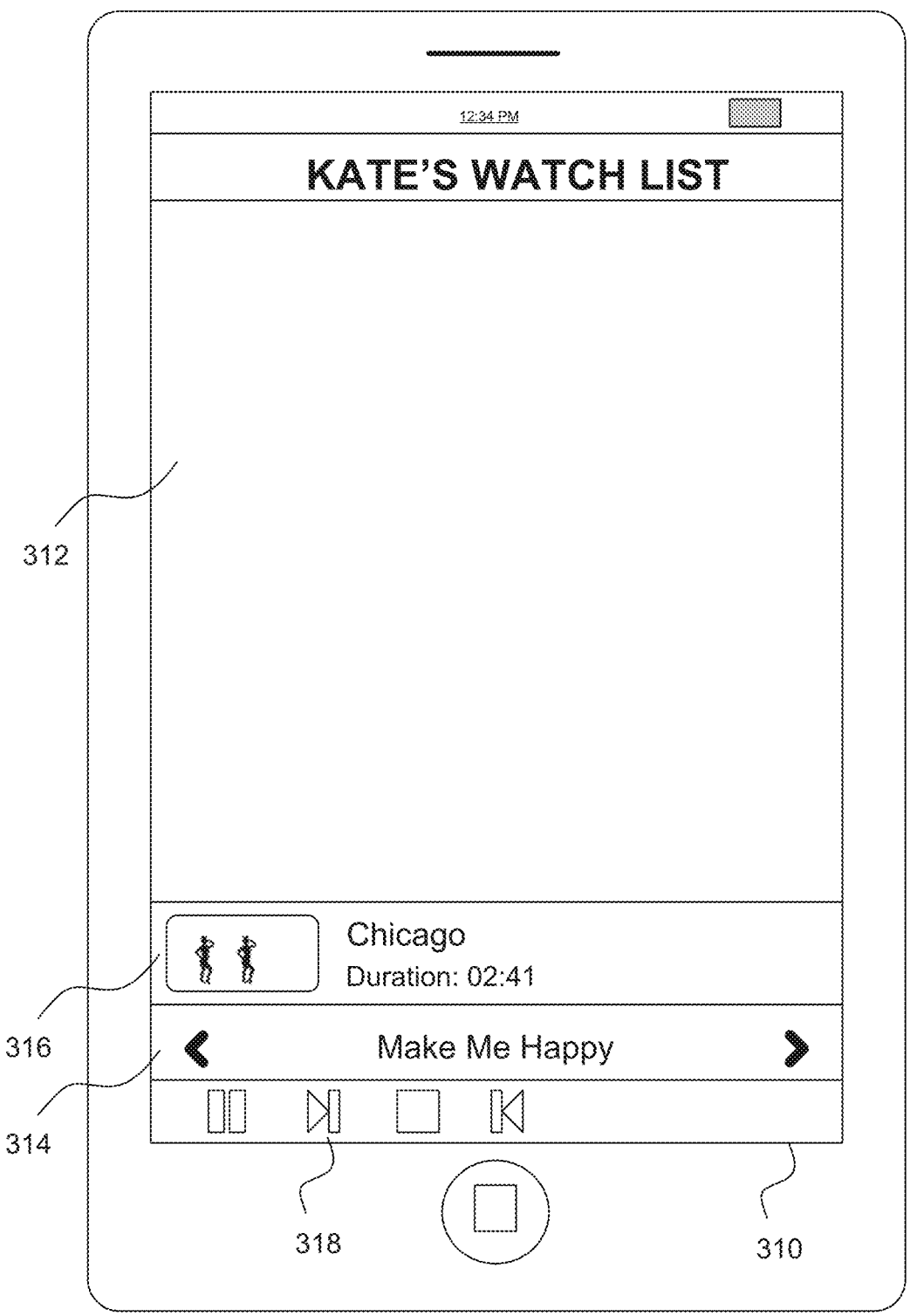

Based on the selection of "Kate," a customized playlist interface 310, as shown in FIG. 3B, is displayed. The playlist interface 310 shows Kate's watch list or playlist. In the present example, Kate has not created a playlist yet; therefore, the playlist interface 310 shows no playlist content in a playlist section 312. The user creates a playlist by scrolling through categories in a category section 314. When the user stops on a category, a recommended content item is displayed in an item section 316. In the present example, the user has stopped scrolling on the "Make Me Happy" category which causes a recommendation of "Chicago" to be presented. The user can select the recommended content item or scroll through the recommended content items until the user reaches a content item they want to add to their playlist. Also shown on the playlist interface 310 is a set of playback controls 318 that allow the user to control playback of content items on the playlist.

Figure 3C:
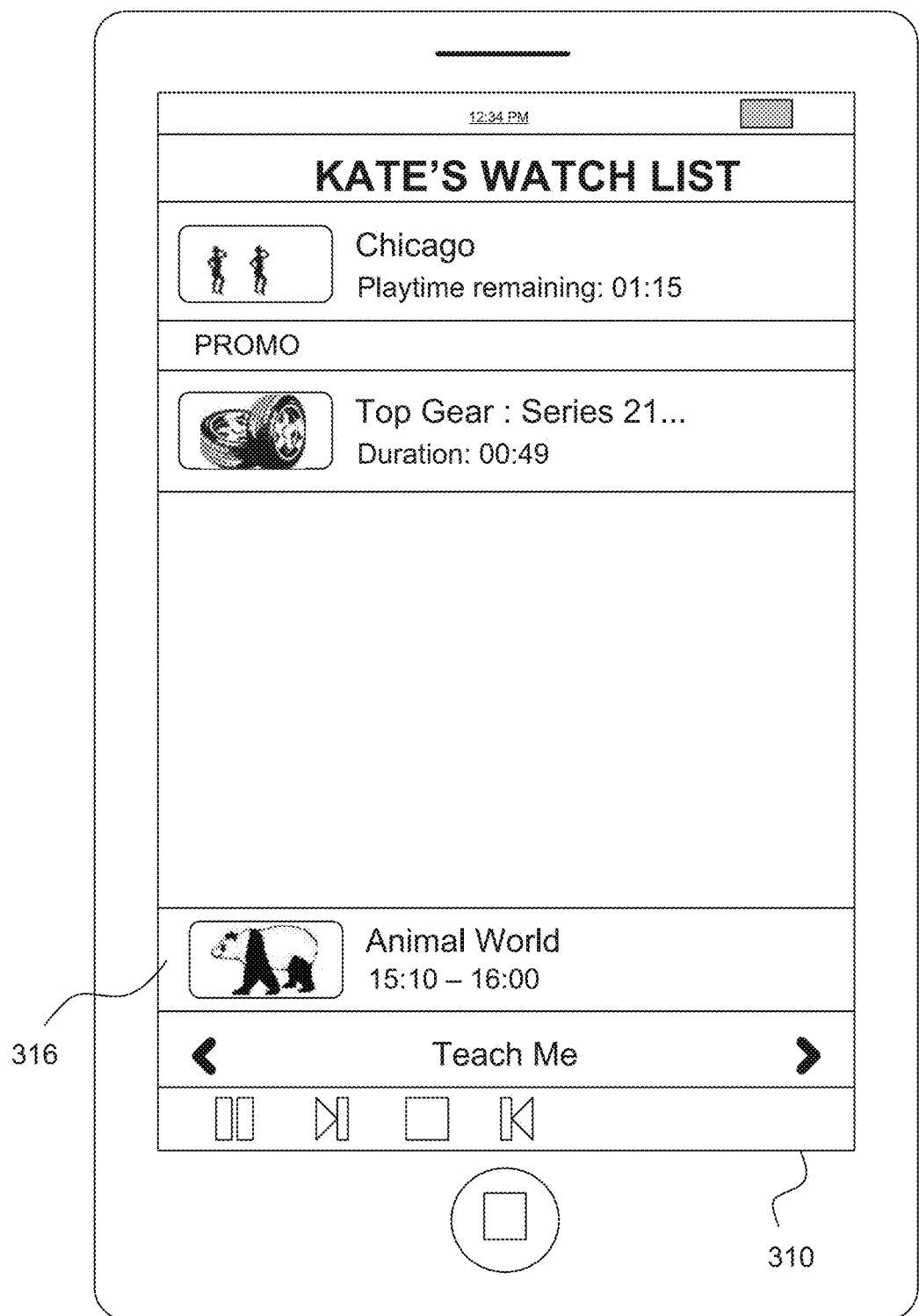

Referring now to FIG. 3C, the playlist interface 310 is shown with some content items added to the playlist. In particular, the user has selected "Chicago" and is currently watching the movie (as evidence by a playtime remaining indication that is less than a duration of the entire movie) on the primary device 106. The user has also added another on-demand content item "Top Gear" to the playlist. In some embodiments, a promo may be added by the listing module 208 between some of the content items in the playlist. The promo may be an advertisement for another content item or advertisement for a product or service.

As evidenced by FIG. 3C, the user can be watching a content item and modifying their playlist at the same time since the content item is being displayed on a screen of the primary device 106 while the playlist is displayed on a screen of the secondary device 102. For example, the user is searching for content items in a "Teach Me" category while watching "Chicago." Alternatively, the user can stop or pause the content item that is currently playing to modify the playlist.

In example embodiments, swiping left in the item section 316 brings up recommended content items that are live content items, while swiping right in the item section 316 brings up recommended content items that are on-demand content items (or vice-versa in an alternative embodiment). In the present example, the user's swipe action causes a live content item to be displayed in the item section 316 ("Animal World").

Figure 3D:
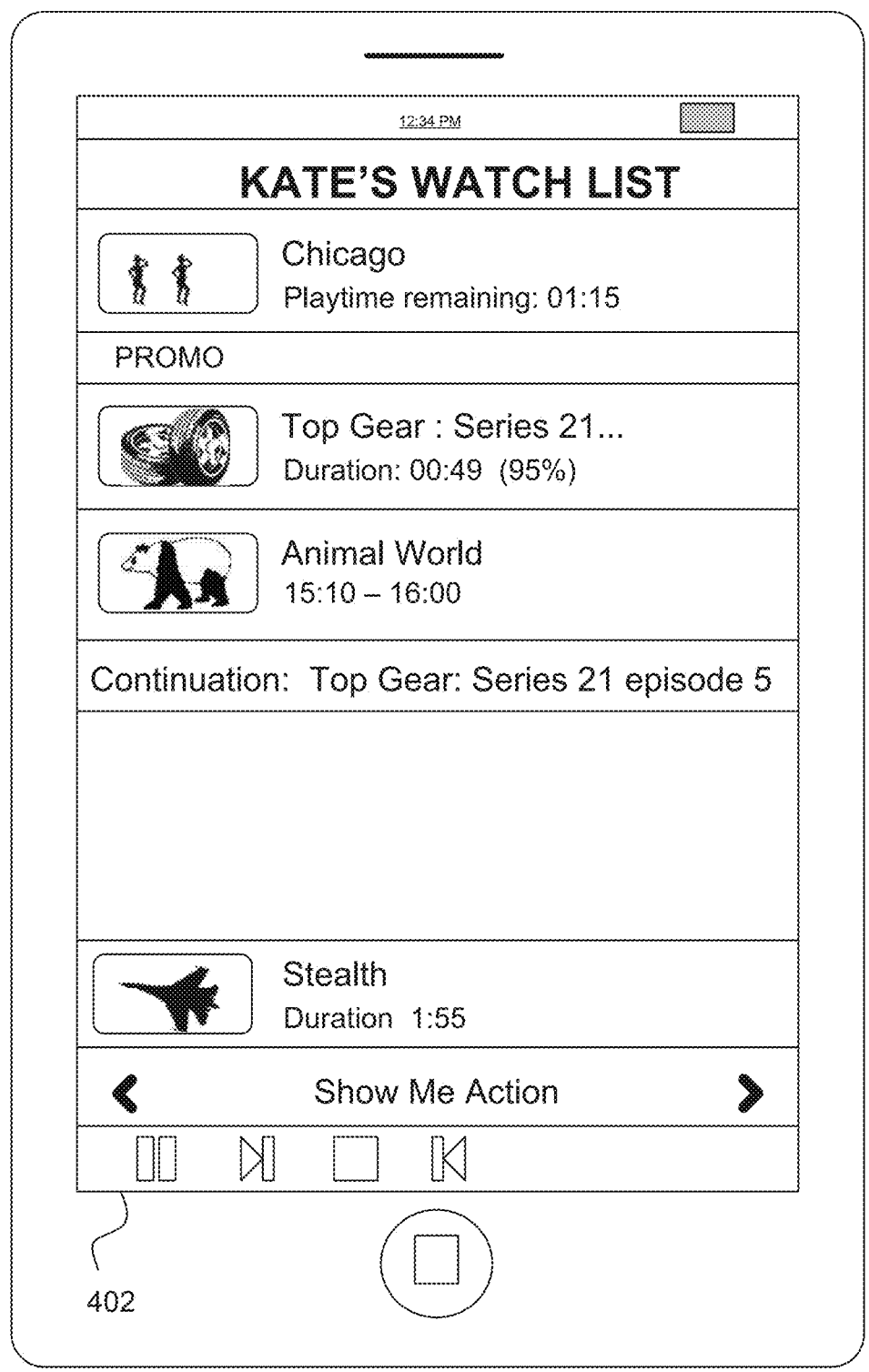

The user selects the live content item ("Animal World") which cause the playlist to be updated as shown in FIG. 3D. Since the live content item has an immovable start time, the on-demand content item immediate prior to the live content item ("Top Gear") cannot finish playing before the start time of the live content item. As such, the prior on-demand content item needs to be segmented (e.g., split) such that the on-demand content item stops playing at the scheduled start time of the live content item. The remaining segment (e.g., the second segment) of the on-demand content item is scheduled to resume immediately after an ending time of the live content item. In the present example, 95% of "Top Gear" is viewable before the live content item "Animal World," and the remaining 5% is scheduled for after completion of "Animal World."

Figure 4:
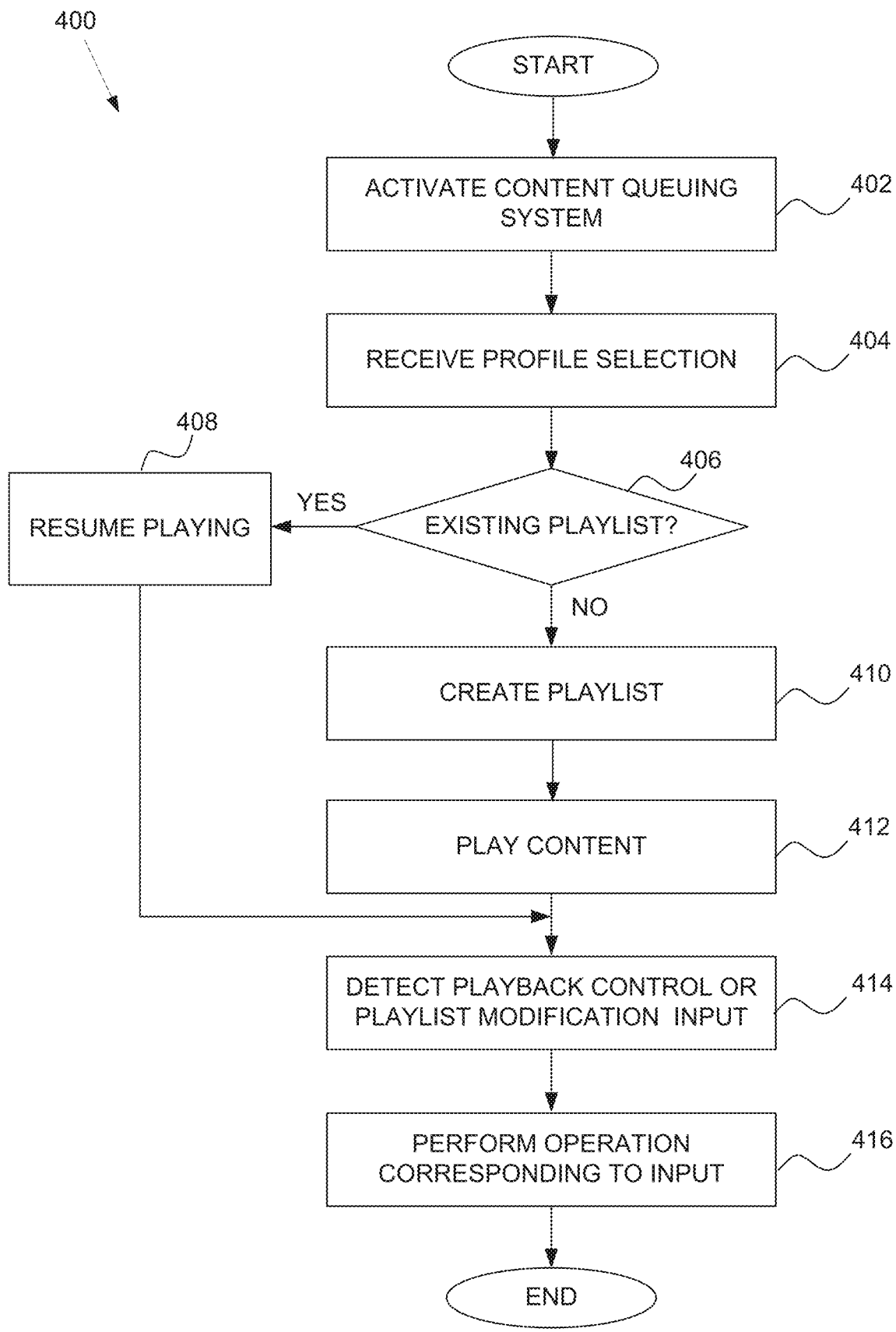
FIG. 4 is a flow diagram of an example method for providing intelligent content queuing and playback.

FIG. 4 is a flow diagram of an example method 400 for providing intelligent content queuing and playback. The method 400 is performed in part or in whole by the content queuing system 200 on the secondary device 102. Accordingly, the method 400 is described by way of example with reference to the content queuing system 200. However, it shall be appreciated that at least some of the operations of the method 400 may be deployed on various other hardware configurations and the method 400 is not intended to be limited to the content queuing system 200.

In operation 402, the content queuing system 200 is activated. In one embodiment, the content queuing system 200 is activated by the user tapping the secondary device 102 to the STB 104. In one embodiment, the content queuing system 200 discovers the STB 104 through Universal Plug and Play (UPnP) standards-based UDP device discovery. The tap also causes the STB 104 to trigger the primary device 106 to turn on.

Upon activation of the content queuing system 200, a profile interface (e.g., profile interface 302) is displayed. In example embodiments, the profile module 206 retrieves profile information and provides the profile information to the user interface module 204 which generates the profile interface 302 for display on the secondary device 102. The profile interface 302 shows all users associated with the secondary device 102 that have set up a profile with the content queuing system 200. The primary device 106 may also show the profile interface 302.

In operation 404, a profile selection is received. Accordingly, the user selects one of the profiles displayed on the profile interface 302 to access list data for the selected profile. The selection is received by the profile module 206 and used by the list module 208 to access list data for the selected profile.

In operation 406, a determination is made as to whether a playlist exists for the selected profile. For example, the list module 208 attempts to access the list data for the selected profile. If list data is found and retrieved by the list module 208, then a playlist exists and is displayed in a playlist interface (e.g., playlist interface 310) on the secondary device 102. In one embodiment, playing of a first content item on the playlist may automatically occur, in operation 408, based on the retrieval of the playlist. Typically, the automatic playback is of an on-demand content item based on the retrieval of the playlist. In an alternative embodiment, playback of the first content item on the playlist is not automatic, and the user selects a "play" playback control displayed on the listing interface to start playing the first content item.

If no list data is stored in memory, then a blank playlist is generated by the user interface module 204 and shown on the playlist interface 310 from which the user creates the playlist in operation 410. Operation 410 will be discussed in more detail in connection with FIG. 5.

Once created (e.g., by adding at least one content item to the playlist), the content automatically starts playing from the playlist in operation 412. In an alternative embodiment, the user can start playing the content on their playlist by, for example, selecting the "play" playback control displayed on the listing interface, assuming that the content item is an on-demand content item. In example embodiments, live content items will automatically play at the scheduled start time without any user input.

In operation 414, the content queuing system 200 detects a further input by the user. The further input may be a playback control input to manipulate playback of a current content item. For example, the user may decide to pause playback. The playback control input is received by the playback controller 214. Subsequently in operation 416, the playback controller 214 sends commands to the STB 104 (or primary device 106) to perform the corresponding operation. In one embodiment, the playback controller 214 uses Digital Living Network Alliance (DLNA)/UPnP commands to initiate, pause, stop, forward, and rewind playback of the content items.

If the playback operation effects timing of playback of content on a playlist that includes live content items, the list module 208 or segmentation module 212 dynamically modifies the playlist to accommodate the playback operation. For example, if the user pauses an on-demand content item for 10 minutes and a live content item is upcoming, then a first segment of an on-demand content item that is segmented around the live content item is shortened by 10 minutes and the second segment lengthened by 10 minutes by the segmentation module 212, and the playlist is updated to indicate these changes.

Alternatively, the further input may be a modification to the playlist. For example, the user may decide to add or delete a content item from the playlist. The user may delete the content item by, for example, swiping the content item off the playlist on the playlist interface 310. The input for adding or deleting a content item is received by the list module 208. Subsequently, in operation 416, the list module 208 modifies the playlist (e.g., adds or deletes the content item from the playlist). The modification may include segmenting, or adjusting the segments of, an on-demand content item around a live content item by the segmentation module 212.

Figure 5:
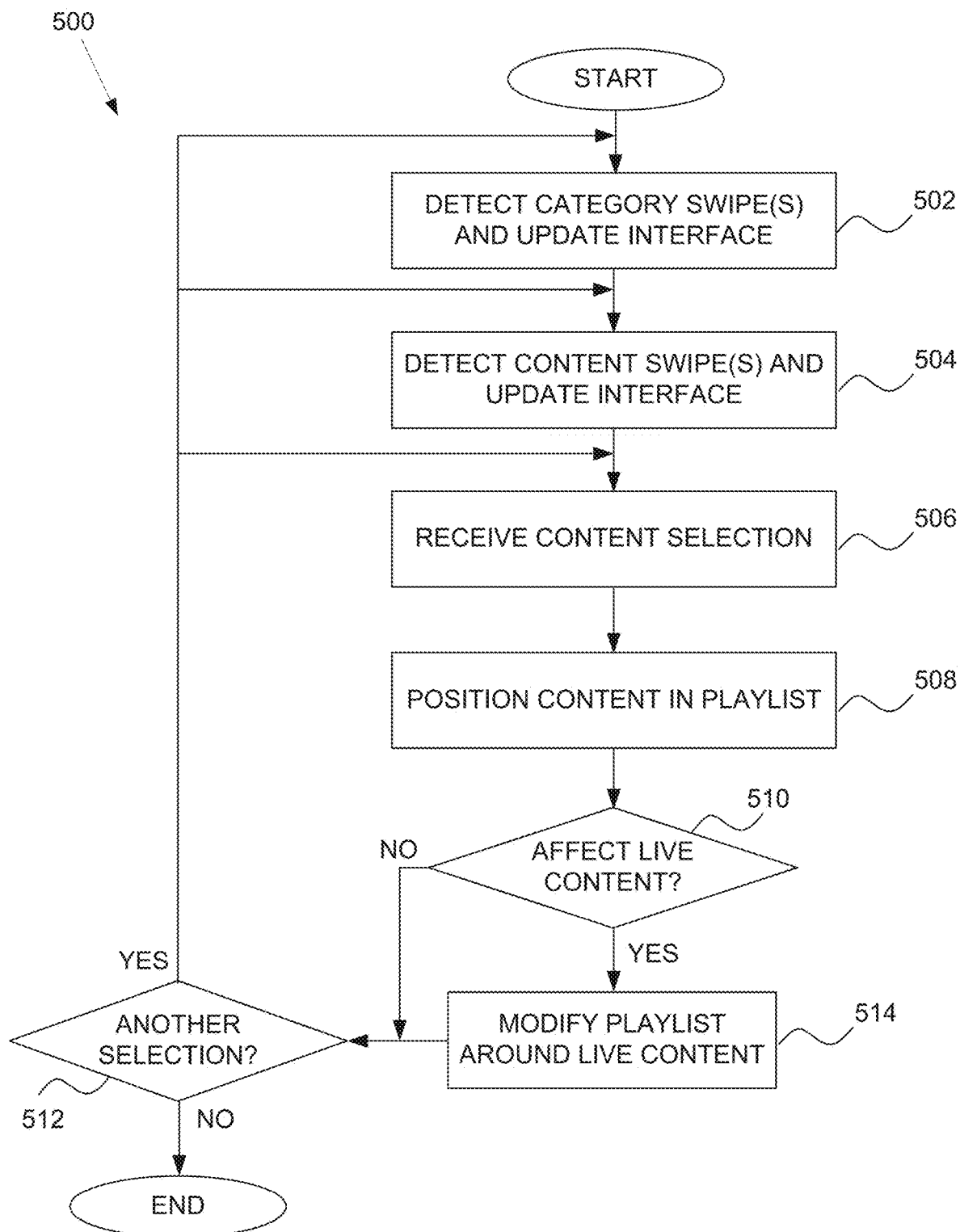
FIG. 5 is a flow diagram of an example method for creating a playlist.

FIG. 5 is a flow diagram of an example method 500 for creating a playlist (e.g., 410) or modifying a playlist. The method 500 is performed in part or in whole by the content queuing system 200 on the secondary device 102. Accordingly, the method 500 is described by way of example with reference to the content queuing system 200. However, it shall be appreciated that at least some of the operations of the method 500 may be deployed on various other hardware configurations and the method 500 is not intended to be limited to the content queuing system 200.

In operation 502, a category swipe or drag is detected and, in response, the playlist interface 310 is updated. In example embodiments, the recommendation module 210 detects the user scrolling through categories in the category section 314 of the playlist interface 310. When the user stops on a category, as detected by the recommendation module 210, a recommended content item is displayed in the item section 316 of the playlist interface 310. The recommended content item is determined by the recommendation module 210.

In operation 504, a content swipe or drag is detected and the playlist interface 310 is updated accordingly. In example embodiments, swiping or dragging left in the item section 316 causes the recommendation module 210 to present live content items in the item section 316, while swiping or dragging right in the item section 316 causes the recommendation module 210 to present on-demand content items in the item section 316 of the playlist interface 310 (or vice-versa in an alternative embodiment).

In operation 506, a content section is received by the list module 208. In one embodiment, the user taps or clicks on the content item in the item section 316 to select the content item. Alternatively, the user can drag and drop the content item into a specific location to select the content item. If the user selects the first content item presented in the item selection based on a category swipe, operation 504 is not needed.

In operation 508, the selected content item is positioned on the playlist by the list module 208. In embodiments where the user taps or clicks on an on-demand content item, the on-demand content item is positioned at the end of the playlist. In contrast, if the user drags and drops an on-demand content item, the on-demand content item will be positioned in a location on the playlist that the user drops the on-demand content item. Further still, a selection of a live content item triggers the list module 208 to position the live content item at a start time of the live content item on the playlist (as determined from the schedule obtained from the schedule provider 108).

In operation 510, a determination is made as to whether the positioning of the new content item affects (or is affected by) a live content item. For example, a start time of a live content item can overlap with playing of an on-demand content item. If the positioning of the new content item does not affect any live content playback, then the method 500 proceeds to operation 512 where a determination is made as to whether the user is making another selection of a content item. For example, the user may continue swiping through categories or content items. If the user is interested in making another selection, the method 500 returns to one of operations 502 (where the user swipes through categories), operation 504 (where the user swipes through content items), or operation 506 (where the user selects a next recommended content item).

If, in operation 510, a live content item is affected by the positioning of the new content item, the playlist is modified in operation 514. For example, if the start time of a live content item overlaps with playing of an on-demand content item, the segmentation module 212 segments the on-demand content item that is overlapping such that a first segment of the on-demand content item will stop playing at the start time of the live content item, and a second segment of the on-demand content item is scheduled to resume after the ending time of the live content item. In another example, a drag and drop of a new on-demand content item prior to a start time of a live content item may cause another on-demand content item to be pushed down in the schedule to after the live content item on the playlist in order to accommodate the new on-demand content item in the schedule.

Figure 6:
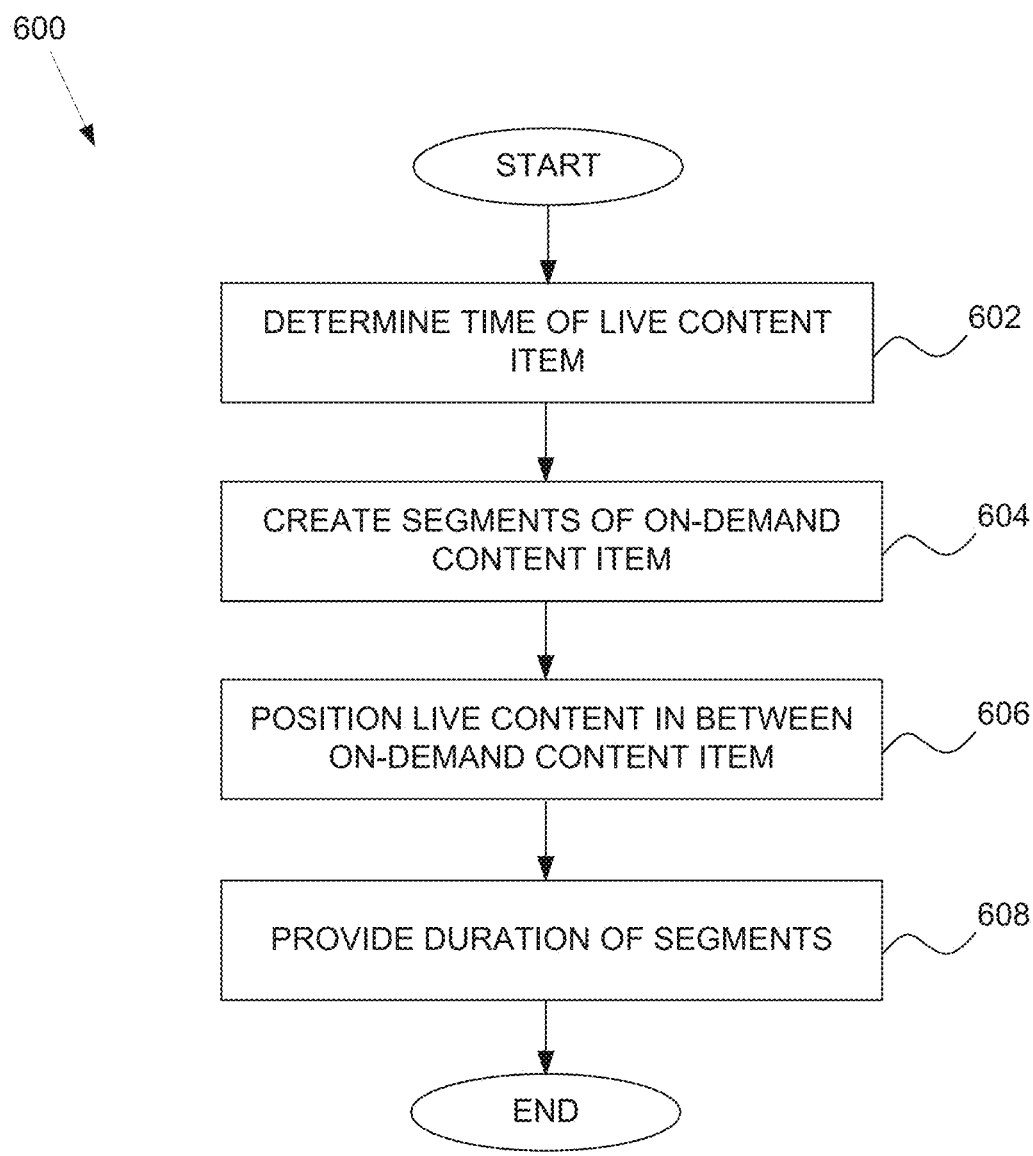
FIG. 6 is a flow diagram of an example method for segmenting on-demand content around live content in the playlist.

FIG. 6 is a flow diagram of an example method 600 for segmenting on-demand content around live content in the playlist. In one embodiment, the method 600 is operation 514. The method 600 is performed in part or in whole by the content queuing system 200 on the secondary device 102. Accordingly, the method 600 is described by way of example with reference to the content queuing system 200. However, it shall be appreciated that at least some of the operations of the method 600 may be deployed on various other hardware configurations and the method 600 is not intended to be limited to the content queuing system 200.

In operation 602, a start and ending time of the live content item is determined. In example embodiments, the list module 208 determines the start and ending times from the schedule received from the schedule provider 108.

In operation 604, the on-demand item affected by the live content item is segmented. For example, if the live content item is schedule to start at 3:30 pm and run for 30 minutes and an on-demand content item with a duration of 1 hour is scheduled to start playing at 3:03 pm, then the on-demand content item will be segmented with a first segment that is 27 minutes in duration. In other words, only 27 minutes of the on-demand content item can be played prior to the start time of the live content item. In some cases, a promo may be inserted into the playlist (e.g., before or after the live content item) by the list module 208. If a promo is inserted, the list module 208 will take an amount of time of the promo (e.g., 1 minute) into account when determining the first segment. A remaining portion of the on-demand content item becomes the second segment.

In operation 606, the live content item is positioned between the first and second segment of the on-demand content item on the playlist. Continuing with the example, the live content item is scheduled at 3:30 pm with the first segment of the on-demand content item that is 27 minutes in duration scheduled prior to the live content item and the second segment of the on-demand content item that is 33 minutes in duration scheduled immediately after the ending time of the live content item.

In operation 608, an indication of the duration for each segment is presented on the playlist. The indication may include an amount of time of content each segment contains or a percentage of a total duration of time for each segment.

It is noted that, in some cases, the on-demand content item can be segmented into more than two segments. For example, if the on-demand content item is two hours in duration and is scheduled to start at 3 pm and there is a first live content item scheduled at 3:30 pm for 30 minutes and a second live content item scheduled at 4:30 pm for 30 minutes, the on-demand content item will be segmented into three segments. The three segments comprise a first segment scheduled for prior to the first live content item, a second segment scheduled between the first and second live content items, and a third segment scheduled for after an end time of the second live content item.

Figure 7:
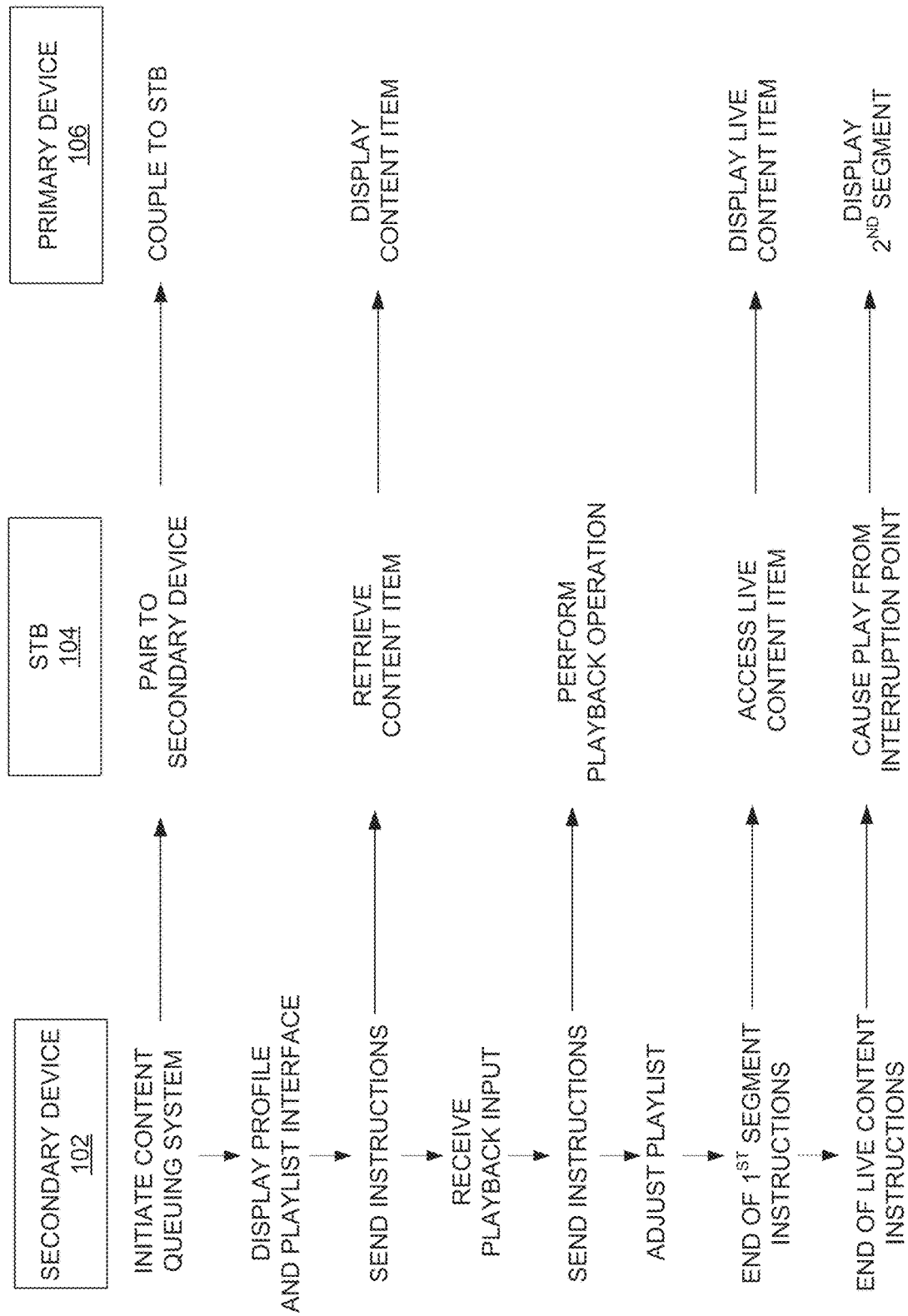
FIG. 7 is a communication flow diagram for controlling playback of content, according to example embodiments.

FIG. 7 is a communication flow diagram for controlling playback of content from a playlist according to example embodiments. The communication flow begins with the secondary device 102 initiating the content queuing system 200. In one embodiment, the content queuing system 200 is initiated (or activated) by tapping the secondary device 102 to the STB 104 to pair the two devices. Once paired, the STB 104 also couples to the primary device 106. If the primary device 106 is not on, the STB 104 will turn on the primary device 106.

Once the content queuing system 200 is activated on the secondary device 102, the content queuing system 200 displays a profile interface (e.g., profile interface 302) from which the user of the secondary device 102 can select, via a touchscreen of the secondary device 102, a profile in order to access list data for the selected profile. Based on the selected profile, the list data is retrieved (e.g., from a storage unit or memory) and used to generate a playlist interface (e.g., playlist interface 310) that is displayed on the touchscreen of the secondary device 102. The playlist interface 310 presents a playlist through which playback of content is triggered. In one embodiment, a first queued content item on the playlist will automatically start playing. In an alternative embodiment, the user selects a "play" playback control on the playlist interface 310 to play the first queued content item on the playlist.

The secondary device 102 electronically transmits instructions to the STB 104 to play the first queued content item. In example embodiments, the STB 104 retrieves or otherwise accesses the first queued content item from a corresponding source (e.g., the content providers 114 or PVR 112). The first queued content item is then displayed on the primary device 106 coupled to the STB 104.

At some point during the playback of content, the secondary device 102 may receive a playback control input. The playback control input may comprise, for example, a pause input, a stop input, a rewind input, or a fast forward input. The secondary device 102 electronically transmits instructions to the STB 104 to cause the STB 104 to perform a corresponding operation to the currently playing content item (e.g., pause, stop, rewind, fast forward).

If there is a live content item scheduled on the playlist, the playback input will likely cause a change to segments scheduled around the live content item. For example, pausing current playback of the content item for 10 minutes will cause a duration of a first segment of an on-demand content item (prior to the live content item on the schedule of the playlist) to be reduced by 10 minutes and cause a duration of a second segment of the on-demand content item (after the live content item on the schedule) to be extended by 10 minutes. As such, the content queuing system 200 on the secondary device 102 adjusts the playlist accordingly.

At the end of the first segment, instructions are automatically, electronically transmitted by the secondary device 102 to the STB 104 to cause a switch in the content being displayed on the primary device 106. Specifically, the instructions cause the STB 104 to pause playback of the on-demand content item, retrieve (or access) the live content item, and provide the live content item to the primary device 106, which displays the live content item on its screen. The secondary device 102 detects the interruption point where the on-demand content item has paused/stopped playing at the end of the first segment and temporarily stores the interruption point in memory.

When an ending time of the live content item is reached, the secondary device 102 automatically, electronically transmits instructions (including an indication of the interruption point) to the STB 104 to cause a switch in the content being displayed. This time, the instructions cause the STB 104 to switch playback back to the on-demand content item that was paused. The STB 104 retrieves or accesses the on-demand content item and begins playback of the second segment from the interruption point on the primary device 106.

It is noted that the communication flow diagram of FIG. 7 is an example embodiment. Alternative embodiments may contemplate other communications flows. For example, the functions of the STB 104 may be embodied within the primary device 106. As a result, the communications sent to the STB 104 will be received, instead, by the primary device 106. In another embodiment, the secondary device 102 may be the primary device 106, and the STB 104 is not necessary. The communications may, in this embodiment, be internal to the secondary device 102.

Figure 8:
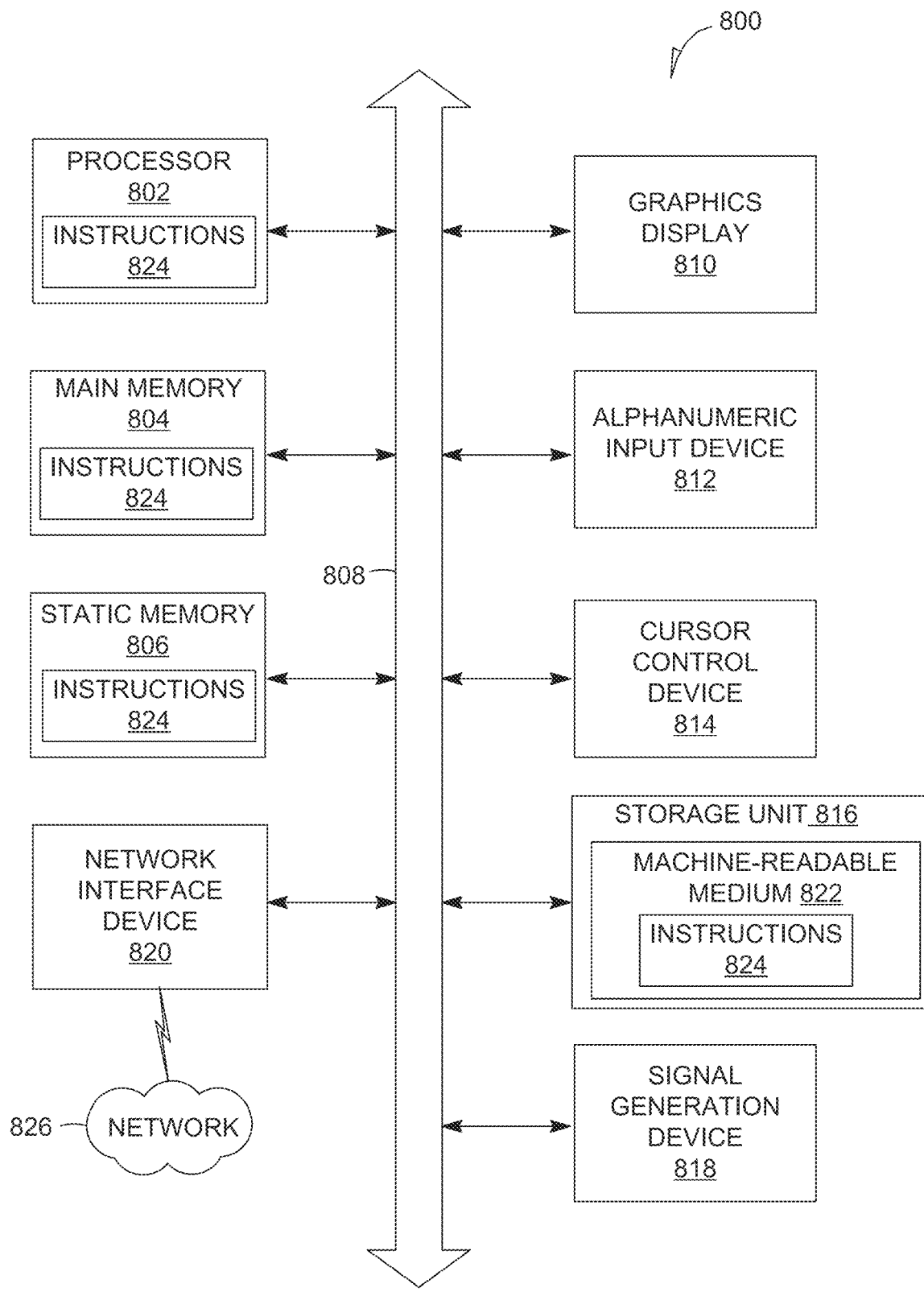
FIG. 8 is a simplified block diagram of a machine in an example form of a computing system within which a set of instructions for causing the machine to perform any one or more of the methodologies discussed herein may be executed.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer device (e.g., a computer) within which the instructions 824 (e.g., software, a program, an application, an applet, an app, or other executable code) for causing the machine 800 to perform any one or more of the methodologies discussed herein may be executed, in whole or in part.

For example the instructions 824 may cause the machine 800 to execute the flow diagrams of FIGS. 4-6. The instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. The machine 800 may be a server computer, a client computer, a personal computer (PC), a tablet computer, a laptop computer, a netbook, a set-top box (e.g. STB 104), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media 822 (e.g., tangible and non-transitory machine-readable media).

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing instructions 824 for execution by a machine (e.g., machine 800), such that the instructions 824, when executed by one or more processors of the machine 800 (e.g., processor 802), cause the machine 800 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 822 is non-transitory in that it does not embody a propagating or transitory signal. However, labeling the machine-readable medium 822 as "non-transitory" should not be construed to mean that the medium is incapable of movement—the medium should be considered as being transportable from one physical location to another. Additionally, since the machine-readable medium 822 is tangible, the medium may be considered to be a machine-readable device. Furthermore, the machine-readable medium 822 does not comprise any transitory signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 822 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    causing presentation, on a display device, of a first content item from a playlist of a viewer, a portion of the first content item being positioned before a second content item on the playlist;
    receiving, from the viewer, a playback control input to be performed on the first content item being presented;
    in response to receiving the playback control input, causing a playback operation corresponding to the playback control input to be performed on the first content item; and
    in response to the playback operation causing the portion of the first content item to conflict with the second content item on the playlist, automatically adjusting, by one or more hardware processors, the first content item on the playlist, the automatically adjusting comprising changing a duration of the portion of the first content item positioned before the second content item on the playlist by an amount of time based on the playback operation and adjusting a duration of a second segment of the first content item positioned after the second content item on the playlist by the amount of time.

2. The method of claim 1, wherein:
    the portion of the first content item comprises all of the first content item; and
    the changing the duration of the portion of the first content item comprises splitting the first content item into at least a first segment and the second segment, the first segment positioned before the second content item and the second segment positioned after the second content item on the playlist.

3. The method of claim 1, wherein the portion of the first content item comprises a first segment of the first content item, the first content item being split between the first segment and the second segment that is positioned after the second content item, the first segment having an end time at a start time of the second content item on the playlist.

4. The method of claim 3, further comprising:
    automatically causing the first content item to stop at an end of the first segment; and
    automatically causing the second content item to begin playing at the start time of the second content item.

5. The method of claim 1, wherein the playback operation caused by the playback control input comprises pausing, stopping, rewinding, or forwarding of the first content item.

6. The method of claim 1, wherein the first content item is an on-demand content item and the second content item is a live content item.

7. The method of claim 1, wherein the second content item has a fixed start time.

8. The method of claim 1, wherein the playback operation caused by the playback control input comprises stopping playback of the first content item, the method further comprising:
    detecting an interruption point where the first content item stopped;

storing the interruption point; and resuming playback of the first content item from the interruption point on a different display device.

9. A system comprising:

one or more hardware processors; and a memory storing instructions that, when executed by the one or more hardware processors, causes a machine to perform operations comprising:

causing presentation on a display device of a first content item from a playlist of a viewer, a portion of the first content item being positioned before a second content item on the playlist;

receiving, from the viewer, a playback control input to be performed on the first content item being presented;

in response to receiving the playback control input, causing a playback operation corresponding to the playback control input to be performed on the first content item; and in response to the playback operation causing the portion of the first content item to conflict with the second content item on the playlist, automatically adjusting the first content item on the playlist, the automatically adjusting comprising changing a duration of the portion of the first content item positioned before the second content item on the playlist by an amount of time based on the playback operation and adjusting a duration of a second segment of the first content item positioned after the second content item on the playlist by the amount of time.

10. The system of claim 9, wherein:

the portion of the first content item comprises all of the first content item; and the changing the duration of the portion of the first content item comprises splitting the first content item into at least a first segment and the second segment, the first segment positioned before the second content item and the second segment positioned after the second content item on the playlist.

11. The system of claim 9, wherein the portion of the first content item comprises a first segment of the first content item, the first content item being split between the first segment and the second segment that is positioned after the second content item, the first segment having an end time at a start time of the second content item on the playlist.

12. The system of claim 11, wherein the playback operations further comprise:

automatically causing the first content item to stop at an end of the first segment; and automatically causing the second content item to begin playing at the start time of the second content item.

13. The system of claim 9, wherein the playback operation caused by the playback control input comprises pausing, stopping, rewinding, or forwarding of the first content item.

14. The system of claim 9, wherein the first content item is an on-demand content item and the second content item is a live content item.

15. The system of claim 9, wherein the second content item has a fixed start time.

16. The system of claim 9, wherein the playback operation caused by the playback control input comprises stopping playback of the first content item, the operations further comprising:

detecting an interruption point where the first content item stopped;

storing the interruption point; and resuming playback of the first content item from the interruption point on a different display device.

17. A non-transitory machine-readable medium that stores instructions that, when executed by one or more processors, cause the one or more processors to perform operations comprising:

causing presentation on a display device of a first content item from a playlist of a viewer, a portion of the first content item being positioned before a second content item on the playlist;

receiving, from the viewer, a playback control input to be performed on the first content item being presented;

in response to receiving the playback control input, causing a playback operation corresponding to the playback control input to be performed on the first content item; and in response to the playback operation causing the portion of the first content item to conflict with the second content item on the playlist, automatically adjusting the first content item on the playlist, the automatically adjusting comprising changing a duration of the portion of the first content item positioned before the second content item on the playlist by an amount of time based on the playback operation and adjusting a duration of a second segment of the first content item positioned after the second content item on the playlist by the amount of time.

18. The non-transitory machine-readable medium of claim 17, wherein the portion of the first content item comprises a first segment of the first content item, the first content item being split between the first segment and the second segment that is positioned after the second content item, the first segment having an end time at a start time of the second content item on the playlist.

* * * * *